United States Patent [19]

Okaniwa et al.

[11] Patent Number: 5,446,968
[45] Date of Patent: Sep. 5, 1995

[54] STRUT HEIGHT ADJUSTING APPARATUS

[75] Inventors: Masuzo Okaniwa; Fumihiro Ohyama, both of Osaka; Masanobu Kishimoto, Yukuhashi; Katsutoshi Jibiki, Kitakyushu, all of Japan

[73] Assignee: Sumitomo Rubber Industries, Ltd., Japan

[21] Appl. No.: 31,994

[22] Filed: Mar. 16, 1993

[30] Foreign Application Priority Data

Mar. 30, 1992 [JP] Japan .................... 4-103618

[51] Int. Cl.⁶ .................... G01C 5/00; G01C 9/14
[52] U.S. Cl. ........................ 33/295; 33/283; 33/293; 33/366; 33/401; 33/DIG. 21
[58] Field of Search ........ 33/391, 392, 401, DIG. 21, 33/293, 294, 295, 398, 402, 283, 366

[56] References Cited

U.S. PATENT DOCUMENTS

| | | | |
|---|---|---|---|
| 2,751,474 | 6/1956 | Reichel et al. | 33/402 X |
| 3,857,639 | 12/1974 | Mason | 33/293 X |
| 3,962,693 | 6/1976 | Schamblin | 33/366 X |
| 4,240,208 | 12/1980 | Pehrson | . |
| 4,484,186 | 11/1984 | Wood et al. | 33/391 X |

FOREIGN PATENT DOCUMENTS

| | | | |
|---|---|---|---|
| 899561 | 4/1953 | Germany | 33/366 |
| 1393541 | 5/1975 | United Kingdom | . |

OTHER PUBLICATIONS

Patent Abstracts of Japan, vol. 14, No. 514 (M-1046) 13 Nov. 1990 & JP-A-22 13 559.

*Primary Examiner*—Alvin Wirthlin

[57] ABSTRACT

A strut height adjusting apparatus for adjusting the height of a strut automatically and simultaneously to measure the height of a floor while ensuring the perpendicularity of the strut with a warning sound or other indication. The strut height adjusting apparatus includes a light receiving unit for receiving a laser beam for use in setting a hypothetical level which is vertically movably and fitted to a hollow body. A pointer provided for the light receiving unit and a scale plate member indicates the position of the pointer provided for the hollow body. The lower end of a rotary unit is set upright in such a way that it abuts against a base floor to be examined. The light receiving unit is moved up and down so that the laser beam from a laser beam emitter may be received at the center of the light receiving unit. The height of the second floor can be measured by reading graduations on the scale plate member as indicated by the pointer. Moreover, a level measuring mechanism is formed with a buzzer for alerting the operator of inclination of the hollow body when a moving member and an outer peripheral member contact and conduct.

4 Claims, 2 Drawing Sheets

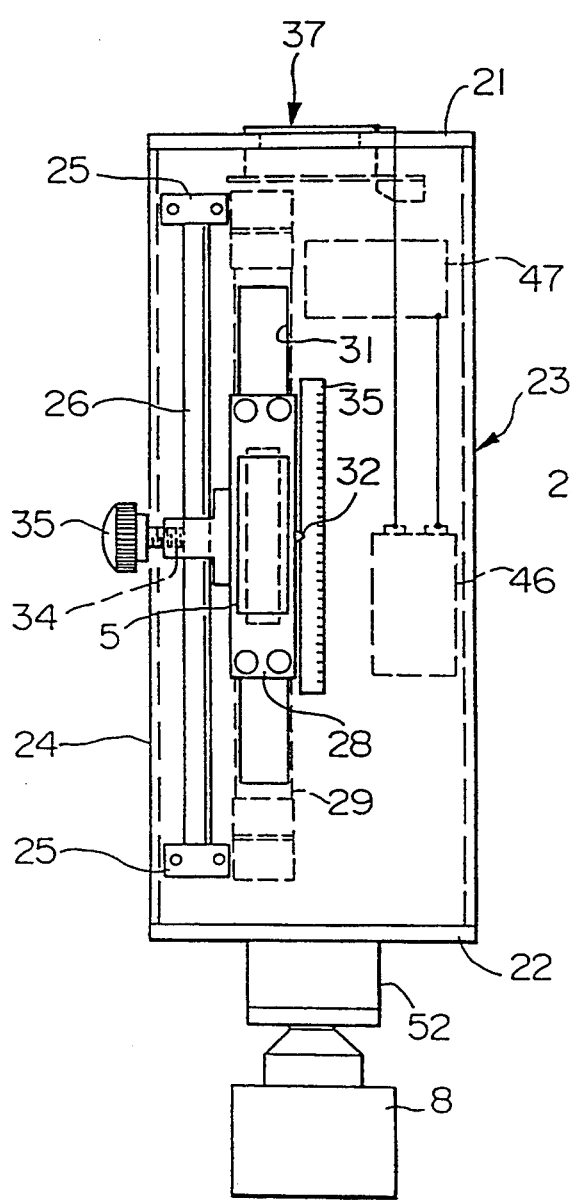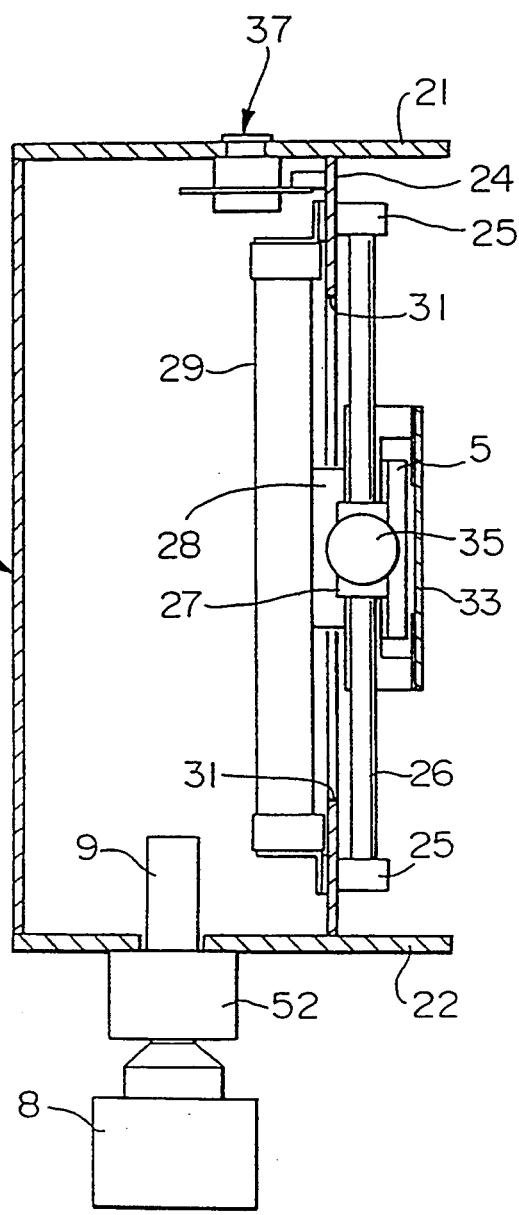

STRUT HEIGHT ADJUSTING APPARATUS

BACKGROUND OF THE INVENTION

The present invention relates to an apparatus for adjusting the height of a strut for supporting a member at a predetermined height and more particularly to improvements in a strut height adjusting apparatus designed to automatically adjust the height thereof in proportion to a difference in level on the side of the strut height adjusting apparatus according to a signal transmitted to indicate a reference level and also capable of measuring the difference in height at a plurality of measuring points.

With the development of office automation (OA) equipment, an increasing number of various electronic equipment have come to be used in business offices. This has resulted in necessitating cable connectors for connecting socket plugs as inlets for several different power supplies and electronic equipment. Today, it is common to construct double-bottomed office floors with connection codes wired therein so that socket plugs and cable connectors may be exposed on the floors close to the installed equipment.

Such a double-bottomed office floor is constructed by covering the floor with a plurality of floor panels at fixed height on a base. The panels are typically square with each side being 30 to 50 cm in length and 15~50 mm thick. The panels are composed of a panel base material made of glass fiber reinforced concrete called GRC, calcium silicate or the like, a steel plate as a liner added to the underside of the panel base material and a carpet tile or a tile of vinyl chloride as a surface plate. Each floor panel is reinforced by a strut for supporting a panel's corner together with the corner of another adjoining floor panel at a fixed height. The outer periphery of the strut is threaded and a support member such as a nut whose central portion meshes with the threads is prepared. The height of the floor panel is adjusted by turning the support member. After all the support members are positioned at the same level, a pedestal is fitted to the strut in such a way that its lower end abuts against the support member and the corner of the floor panel together with the corner of another floor panel adjacent thereto is mounted on the pedestal to cover the floor with the floor panels at the desired uniform level.

Another method of constructing a double-bottomed floor comprises the steps of forming a notch in each corner of a floor panel, the notch being large enough for at least a quarter of a strut to be received thereby, securing a nut to locate a threaded hole at the notch beforehand, fitting the strut in the nut and installing the combination of them on a base material, arranging a floor panel without such a nut next to what has the nut for common use in supporting the floor panel without the nut, and adjusting the height of the nut by turning the strut. This method of construction is advantageous in that even after the floor has completely been covered with the floor panels, level adjustments can be made by inserting a jig such as a screwdriver through the notches in the corners of the floor panels and turning the struts. The maximum diameter of the strut is about 10 mm. Decorative surface materials such as a carpet or glazed vinyl chloride tiles can be spread on the floor panels for covering, the openings for the struts.

A practice common with the aforementioned two methods of laying floor panels is to ink meshes (normally 450 to 500 mm meshes) for matching the size of the floor panel on the base material in order to install struts at the intersection points of the ink lines. This practice is employed to make uniform the height of all struts, that is to place, support members on the same plane.

Conventional methods of covering a floor with floor panels includes, in order to make the height of all struts uniform on the same plane, providing a reference strut for every 10 to 20 struts, and adjusting the height of these struts using a measuring level and a graduated rod called a staff to adjust the support members of the remaining struts existing between the reference struts to the same height of the reference strut by stretching a snapping line between the support members of such reference struts. Under the conventional methods, however, at least two skilled persons are required to make height adjustments using the levels and the staffs. Further, the technicians must continuously bend down during the work resulting in frequent backaches.

In the field of construction, on the other hand, Spectra Physics Company of the United States markets an automatic level control apparatus under the trade names of "Electronic Level EL-1" (hereinafter called "EL-1") and "Level Eye 1077" (hereinafter called "Level Eye"). The apparatus is equipped with a laser emission unit for emitting a laser beam at a desired preset level and designed, upon receiving the laser beam from the laser emission unit, to produce a signal which varies with the vertical movement of the position of the beam received for displaying a difference in level. More specifically, EL-1 is first secured to a tripod and set to a desired level, whereas Level Eye is fitted to a member whose height is to be adjusted. By varying the level of the member until Level Eye receives a laser beam from EL-1 in the optimum condition, the member can be set to the desired level. Moreover, it is unnecessary to move EL-1 once it has been set even though there are places where the level has to be measured as the laser beam from EL-1 is rotatably emitted in the horizontal direction. Since only Eye Level needs to be moved, one worker can perform the whole operation.

Japanese Patent Laid-Open No. 213559/1990 illustrates a strut height adjusting apparatus which is capable of making struts installed on a base material automatically uniform in height while utilizing the previously noted automatic level control and of being operated by one person without bending. Referring to FIG. 5, the strut height adjusting apparatus, includes a laser beam emitter 3 fitted onto, for instance, a tripod 2 on a base material 1 and used for rotatably emitting a laser beam in the horizontal direction at a reference level (or hypothetical level) and a strut height adjusting unit 4 which functions to make the struts uniform in height upon receiving the laser beam emitted from the laser beam emitter 3. The term "hypothetical level" refers to a hypothetical reference plane established above a base plane among a central light source and a plurality of strut height adjusting apparatus, in which the hypothetical level reflects the desired position for the secondary floor. The strut height adjusting unit 4 further includes a rotary unit 8 for rotating a laser beam receiving unit 5 and a nut 7 on a bolt strut 6 for a floor panel, a motor 9 for driving the rotary unit 8, a control unit 10 for controlling the rotation of the motor 9 on receiving a signal from the laser beam receiving unit 5, a handle 11 for holding upright the strut height adjusting unit 4 and a level 12 as a guide for holding upright the strut height adjusting unit 4. The laser beam receiving unit 5 is formed with a plurality of semiconductor light receiving elements arranged longitudinally as position detecting elements 5a. The laser beam receiving unit 5 generates a match signal when a position detecting element 5a located in the center of the laser beam receiving unit 5 receives the laser beam. The control unit 10 causes a signal tone to occur as the received laser approaches a predetermined level. Alternatively, a bar mark can to be displayed on a display unit to indicate differences in height. The term "bar mark" refers to a visual display indicating whether the laser beam directed to a selected one of the strut adjusting apparatus is above or below the desired hypothetical plane. This term is well known in the art as indicative of a particular type of display mechanism. The control unit 10 processes the signal from the position detecting element 5a so as to convert it into position data for controlling the rotation of the motor 9 clockwise and counterclockwise according to the position data.

With this arrangement, the laser beam emitter 3 is placed at any given position on the base material 1 to set the hypothetical level by means of the laser beam, and the strut height adjusting unit 4 is set upright by fitting the rotary unit 8 of the strut height adjusting unit 4 into the nut 7 of the bolt strut 6 while holding the handle 11 with the hands and also watching the level 12. When the position detecting element 5a of the laser beam receiving unit 5 receives the laser beam, the control unit 10 identifies which one of the position detecting elements has received the laser beam and rotates the motor 9 clockwise or counterclockwise according to the data on the difference in height between the hypothetical and actual levels. When the motor 9 rotates clockwise, the nut 7 ascends along the bolt strut 6 and when it rotates counterclockwise, the nut 7 descends. Since the rotation of the motor 9 results in moving the strut height adjusting unit 4 up and down as the nut 7 moves up and down, the control unit 10 stops the motor 9 when it has sensed that the position detecting element 5a in the center of the laser beam receiving unit 5 has received the laser beam. When the motor 9 stops rotating the nut 7 is then anchored at the fixed position of the bolt strut 6. This process is applied to all bolt struts 6 so that all the nuts 7 can be positioned on the same plane.

The aforementioned strut height adjusting apparatus is useful for arranging the positions of respective strut height adjusting members along one preset hypothetical level. Although the setting of the hypothetical level is normally based on the height of the floor at the doorway, the height of the floor tends to vary with respect to the doorway height when a double-bottomed floor is constructed in a room having more than one doorway. This makes it necessary to measure the height of the floor at each doorway to obtain the mean value, for example, for the purpose of setting a hypothetical level. As a consequence, measuring levels, staffs and the like must be employed individually to measure the height of the desired level.

Although the aforementioned level of strut height adjusting unit is designed to operate in a perpendicular position in accordance with the position of bubbles in the hermetically sealed water. Such a level is too sensitive in that slight jolting allows the bubble to move and if much attention is directed to the level, the fitting of the strut height adjusting unit to the strut may be neglected, thus decreasing work efficiently.

SUMMARY OF THE INVENTION

An object of the present invention is to provide a strut height adjusting apparatus which is designed to measure the height of a floor and the like by simply improving the strut height adjusting unit that has been described above.

Another object of the present invention is to provide a strut height adjusting apparatus capable of facilitating the checking of perpendicularity of a strut by making it possible to check such perpendicularity by means of a warning sound or display.

A strut height adjusting apparatus according to a preferred embodiment of the present invention comprises reception mechanism fitted to a hollow body for use in receiving a level signal from a signal generating mechanism for generating a level signal indicating a hypothetical level of height and delivering an output signal indicating the difference between a reference positional signal indicating a reference position and the level signal, an adjusting mechanism fitted to the lower end of the hollow body, one end of the adjusting mechanism being connected detachably to a height adjusting member of a strut for supporting the hollow body in such a way as to make the height adjusting member manipulatable, and a control mechanism for controlling the operation of the adjusting mechanism in response to the output signal from the reception mechanism so as to stop driving the adjusting mechanism when the difference is nullified, wherein the reception mechanism has a marking unit vertically movably fitted to the hollow body and used for indicating a preset position, whereas a scale unit for indicating the position of the marking unit is set adjacent to the leading end of the marking unit in the hollow body.

A strut height adjusting apparatus according to the preferred embodiment of the present invention has a hollow body further including a level measuring mechanism having a conductive pendulum which rocks as the hollow body inclines, a conductive annular member surrounding the pendulum, and a warning device means for notifying that the hollow body has inclined when the pendulum and the annular member contact and conduct.

Having the scale marked with numerical measuring degrees from the center thereof, for instance, the strut height adjusting unit is installed upright so as to abut the lower end of the adjusting mechanism against the floor surface. The signal generating mechanism is then operated to transmit a level signal to the reception mechanism. The reception mechanism is moved up or down so that the level signal from the signal generating mechanism conforms to the zero point of the reception mechanism. Whether or not the reception mechanism has been so positioned as to receive the level signal at its zero point may easily be identified by checking the fact that the adjusting mechanism has stopped to operate or the signal tone has changed as stated above. The height at the measuring spot can be measured by reading the numerical value on the scale as indicated by the marking unit. This operation is repeated on the floor surfaces close to the respective doorways to obtain the mean value of the measured results. The hypothecated level is thus set.

With the horizontal measuring mechanism for detecting the inclination of the strut height adjusting unit, moreover, the warning device operates when it inclines to notify that the hollow body has inclined using a buzzer or a lamp. Consequently, any person in charge may be able to devote himself to the work of examining the floor surface and adjusting the height of a strut solely by adjusting the inclination of the hollow body only when the warning device operates without monitoring the level as before.

These and other objects and advantages may be achieved by one of ordinary skill in the art by reference to the following detailed description in light of the accompanying drawings.

BRIEF DESCRIPTION OF THE DRAWINGS

FIG. 1 represents an elevational view of an embodiment of the present invention.

FIG. 2 is an illustration of a side sectional view of FIG. 1.

DETAILED DESCRIPTION OF THE PREFERRED EMBODIMENT

Figure 3:
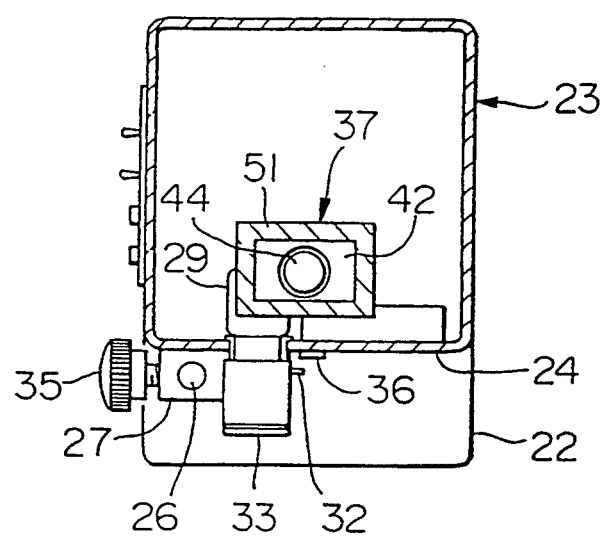
FIG. 3 is an illustration of a partially elevated sectional view of FIG. 1.

Referring to the accompanying drawings, an embodiment of the present invention will be described, wherein like reference characters designate substantially similar component parts and the detailed description thereof will be omitted.

A support rod 26 with its upper and lower ends supported by respective support members 25 is fitted to a side plate 24 of a square cylindrical hollow body 23 with a predetermined space apart therefrom. An upper plate 21 closes the upper end of the hollow body 23 with a bottom plate 22 closing its lower end thereof. A block 27 is vertically movably fitted to the support rod 26 and integrally provided on the front side of a support base 28 for supporting a light receiving unit 5 formed with a plurality of semiconductor light receiving elements or the like arranged longitudinally as position detecting elements, the rear portion of the support base 28 being vertically movably accommodated in a support member 29 provided on the underside of the side plate 24. A longitudinal hole 31 for allowing the block 27 to move vertically is formed in the side plate 24. A pointer 32 is fitted to the side of the support base 28 at a position corresponding to the light and positioned substantially in the center of the vertical direction of the light receiving unit 5. The front side of the light receiving unit 5 is protected with transparent glass or a protective plastic member 33. A threaded hole 34 passed up to the support rod 26 is formed in the block 27 and a fixing bolt 35 is fitted in the threaded hole 34. When the fixing bolt 35 is loosened, the support base 28 is made vertically movable and when it is tightened, the support base 28 is fixed in that position. A vertically elongated scale plate member 36 is fitted to the side plate 24 in such a way as to overlap the leading end of the pointer 32 and the scale plate member 36, which is graduated at equal intervals.

Figure 4:
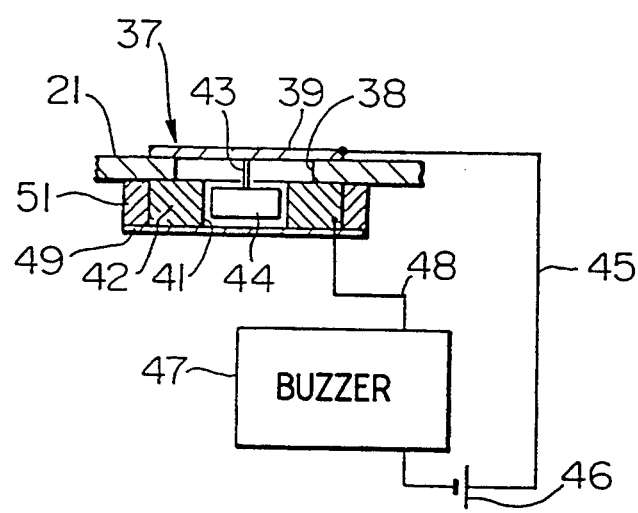
FIG. 4 is a schematic diagram of a level measuring unit.
Figure 5:
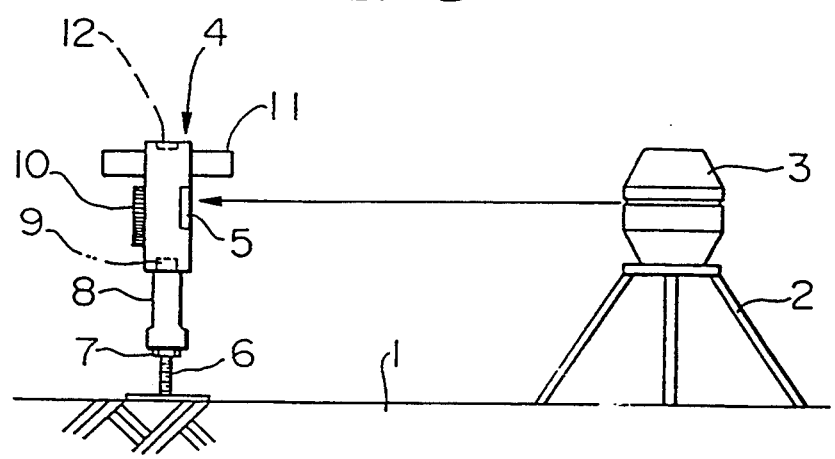
FIG. 5 is a diagram illustrating a conventional strut height adjusting apparatus.

A level measuring mechanism 37 is fitted to the upper plate 21. As shown in FIGS. 3 and 4 in detail, the level measuring mechanism 37 comprises a conductive cover 39 fitted so as to cover an opening 38 formed in the upper plate 21, a round hole 41 being formed in the center thereof, an outer peripheral member 42 fitted to the upper plate 21 in such a way that the round hole 41 is positioned beneath the opening 38, and a conductive moving member 44 suspended by a conductor 43 from the cover 39 and idly fitted in the round hole 41 of the outer peripheral member 42. The cover 39 is connected via a connecting wire 45 to a power supply cell 46. A connecting wire 48 connects the power supply cell 46 via a buzzer 47 and a nonconductive lower plate member 49 to the outer peripheral member 42. Consequently, the buzzer 47 operates when the moving member 44 sways to the extent that it contacts the outer peripheral member 42. Numeral 51 denotes a protective cover.

The motor 9 is fitted onto the bottom plate 22 and the upper end of the rotary unit 8 is fitted to the drive shaft (not shown) of the motor 9. The rotary unit 8 is rotatably supported by a bearing 52 on the bottom plate 22 and a hole (not shown) for receiving the nut 7 of a bolt strut 6 for a floor panel is formed in the lower edge face. The construction of the portion described above is similar to the rotary unit disclosed in Japanese Patent Laid-Open No. 213559/1990.

The graduations on the scale plate member 36 may be so arranged as to indicate the height of the rotary unit 8 from its lowermost edge face.

With this arrangement, when the height of a floor near a doorway is measured, a strut adjusting apparatus is installed upright while abutting the lower face of the rotary unit 8 against the floor and the light receiving unit 5 is enabled to receive the laser beam from the laser beam emitter 3 installed in a given position on the base material 1. When the position of the light receiving unit 5 shifts from the position of the pointer 32 in response to the laser beam, the fixing bolt 35 is loosened to enable the support base 28 to move vertically up or down for orienting a selected one of the light receiving elements of the light receiving unit 5 in position with respect to the pointer 32. When the position of the selected light receiving element conforms to the intended position, the fixing bolt 35 is tightened again to fix the support base 28, so that the graduation on the scale plate member 36 as indicated by the pointer 32 may be then read. An operator may confirm proper positioning by visually observing whether or not the light receiving element conforming to the position of the pointer 32 has received the laser beam. Alternatively, the rotary unit 8 which functions to stop the rotation of the nut 7 of the bolt strut 6 for a floor panel when it reaches a predetermined level may be utilized to confirm whether or not the light receiving element conforming to the position of the pointer 32 has received the laser beam or otherwise the variation of the signal tone caused by the control unit 8 or the bar mark in the display unit may be used easily to confirm the effect as stated above.

The operation previously noted is performed in every doorway to obtain the mean value and this value may be used to set a hypothetical level in consideration of the height of the floor at the doorway involved. If the strut height adjusting apparatus inclines during the time when the measurement is made, the moving member 44 of the level measuring mechanism 37 rocks and comes in contact with the outer peripheral member 42, thus causing the buzzer 47 to operate. The buzzer sound alerts the operator of the inclination of the strut height adjusting apparatus. Since the setting of the angle at which the buzzer 47 operates can be determined by the width of the gap between the moving member 44 and the outer peripheral member 42, the determination of the width thereof may be based on the allowable angle of inclination of the bolt strut 6 for a floor panel.

By effecting a simple improvement for the apparatus disclosed in Japanese Patent Laid-Open No. 213559/1990, one strut height adjusting apparatus is usable for not only setting the level of the bolt strut 6 for a floor panel but also measuring the height of the floor. Since the inclination of the strut height adjusting apparatus is made known by the buzzer sound, it is possible to measure the height of a floor and to set the level of the bolt strut 6 for a floor panel with efficiency.

Although the sound of the buzzer 47 is used to signal the inclination of the strut height adjusting apparatus in the embodiment shown, a lamp may be employed to warn of such inclination. Since the aforementioned light receiving unit 5 of Japanese Patent Laid-Open No. 213559/1990 is designed to issue a match signal when the position detecting element located in the center receives the laser beam or to boost the signal tone as the predetermined level is attained or to inform the level difference by means of a bar mark to be displayed on a display unit, the adjustment of the vertical movement of the light receiving unit 5 may be made by utilizing the variation of the signal tone or the bar mark.

Although the construction of a double-bottomed floor has been referred to in the embodiment shown by way of example, the application of the strut height adjusting apparatus is not limited to such floor panels but may also be used to level the height of beams, posts and the like. The present strut height adjusting apparatus may also have a wide range of other uses as means of measuring the height of floors in addition to those of uniformly arranging the height of struts in the fields of civil engineering, construction and the like.

As set forth above, the strut height adjusting apparatus according to the present invention comprises a reception mechanism vertically movably fitted to the hollow body and a marking unit for displaying a preset position. The hollow body having the scale unit for displaying the position of the marking unit in such a way that the scale unit is adjacent to the leading end of the marking unit. The strut height adjusting apparatus is set upright so that the lower end of the adjusting mechanism abuts against the surface of a floor to be examined and the reception mechanism is moved vertically so that its central portion receives a level signal from the signal generating mechanism. The height of the floor can thus be measured by reading the gradation on the scale unit as then indicated by the marking unit. Whether or not the central portion of the reception mechanism has received the level signal can easily be identified by confirming the fact that the adjusting mechanism has stopped to operate or the variation of the signal tone.

According to the present invention, the provision of the level measuring mechanism having the conductive pendulum, the conductive annular member so arranged as to surround the pendulum and the warning device for notifying that the hollow body has inclined when the pendulum and the annular member contact and conduct makes it possible to inform the operator that the hollow body has inclined since the warning device then operates to sound the buzzer or turn on the lamp. Moreover, the level need not always be monitored as before and the inclination of the hollow body should be corrected only when the warning device operates. As a result, the operator is allowed to devote himself to the work of not only examining floor surfaces but also adjusting the height of struts.

What is claimed is:

1. A strut height adjusting apparatus capable of receiving a level signal from a signal generating means for use in establishing a hypothetical level in a spaced relationship to a base reference plane, the apparatus comprising:
   a supporting body with a fixed portion and an adjustable portion;
   a reception device movably mounted on the adjustable portion of the supporting body for receiving said level signal from said signal generating means and producing an output signal indicating the difference in distance between a reference position and said level signal;
   first adjustment means for automatically letting the height of a strut by adjusting the position of the adjustable portion of the supporting body with respect to the base reference plane to a selected position in response to the output signal produced by said reception device until the reference position coincides with the position of the level signal;
   scale means for identifying the position of the reception device with respect to the adjustable portion of the supporting body; and
   second adjustment means for adjusting the position of the reception device with respect to the adjustable portion of the supporting body using said scale means.

2. A strut height adjusting apparatus as recited in claim 1 further comprising:
   level measuring means for detecting an inclination of said supporting body from a level position and for producing an inclination signal when the inclination of said hollow body exceeds a predetermined range of inclination from the level position; and
   a warning device responsive to said inclination signal for indicating when the inclination of said supporting body exceeds the predetermined range of inclination.

3. A strut height adjusting apparatus as recited in claim 2, wherein said level measuring means comprises,
   a conductive pendulum which moves in accordance with the inclination of the supporting body, and
   a conductive annular member with an aperture for receiving the conductive pendulum so that in the level position the conductive pendulum is suspended within the aperture in a spaced relationship with respect to the conductive annular member and when the inclination of said supporting body exceeds the predetermined range of inclination the conductive pendulum moves into electrical contact with the annular member producing the inclination signal.

4. A strut height adjusting apparatus as recited in claim 1, said scale means comprises
   a scale fixedly mounted to the adjustable portion of said supporting body for showing the position of the reception device relative to the adjustable portion of the supporting body, and
   said second adjustment means comprising means for manually adjusting the position of the reception device with respect to the adjustable portion of the supporting body by visually observing the fixedly mounted scale.

* * * * *